April 21, 1959 A. NUUT 2,883,618

SERVO CONTROLLER CIRCUIT

Filed April 12, 1956

2 Sheets-Sheet 1

August Nuut
INVENTOR

BY [signature]

ATTORNEY

April 21, 1959

A. NUUT

SERVO CONTROLLER CIRCUIT 2,883,618

Filed April 12, 1956

2 Sheets-Sheet 2

August Nuut
INVENTOR

BY Forrest J. Lilly

ATTORNEY

United States Patent Office 2,883,618

Patented Apr. 21, 1959

2,883,618

SERVO CONTROLLER CIRCUIT

August Nuut, Glendale, Calif., assignor, by mesne assignments, to Hymac Corporation, Los Angeles, Calif., a corporation of California Application April 12, 1956, Serial No. 577,760

15 Claims. (Cl. 324—62)

The present invention relates generally to servo circuits and more particularly to a carrier type servo controller circuit.

Means for stabilizing carrier type servos include such devices as passive electrical and mechanical filters which are constructed to operate on the carrier frequency; electromechanical controllers such as tachometer generators or motor-tachometer combinations; or demodulator, equalizer, modulator combinations which convert the carrier into direct current, pass the demodulated signal through an appropriate filter (equalizer) and then remodulate a carrier with the resultant signal.

It is an object of this invention to provide novel means for stabilizing a servo circuit, which means performs the functions of a derivative controller and noise filter in addition to the functions as a modulator and mixer.

Another object of the invention is to provide a stabilized self-balancing bridge servo circuit for digital measurement of resistance, for example.

Another object of this invention is to provide a controller circuit used in connection with an amplifier in which part of the controller circuit serves as the input circuit to the amplifier.

A further object of this invention is to provide a stabilized amplifier circuit for use with the controller circuit.

Briefly, the foregoing and other objects of this invention are preferably accomplished by providing a chopper having a single pole that makes alternately with two contacts, the chopper being driven at carrier frequency. An input voltage can be provided on one contact, a storage capacitor being connected to the chopper pole. A comparison voltage can be provided through a suitable resistance to the other contact, and an output signal is derived across a resistor coupled to the latter contact by a suitable capacitor. This controller circuit is incorporated in a self-balancing bridge circuit for digital measurement of resistance, for example.

The invention possesses other objects and features, some of which together with the foregoing will be set forth in the following description of a preferred embodiment of the invention, and the invention will be more fully understood by reference to the accompanying drawings, in which.

Figures 1, 2:
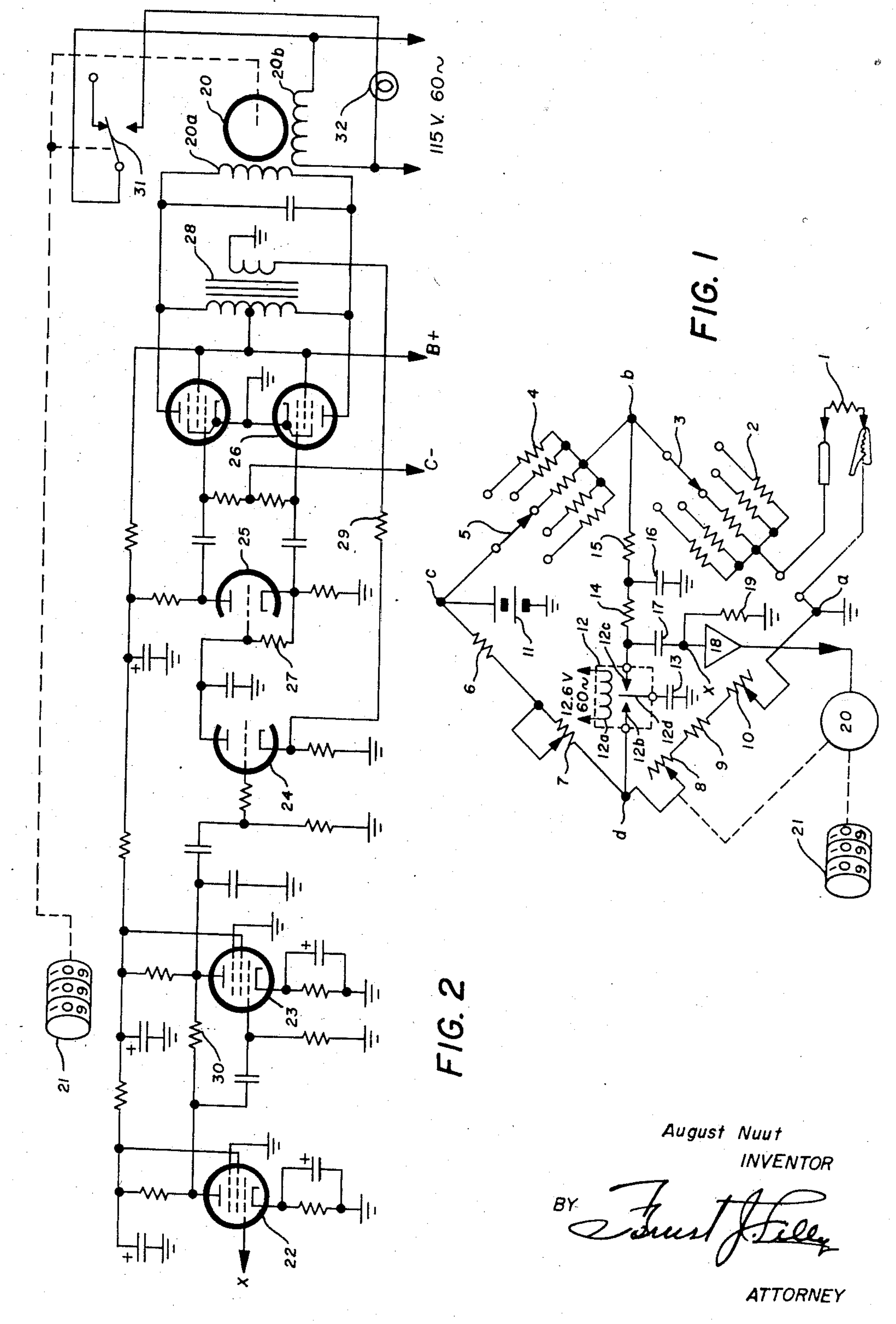
Figure 1 is a circuit diagram showing a preferred embodiment of a resistance self-balancing bridge servo circuit.
Figure 2 is a detailed wiring diagram of an amplifier circuit used in conjunction with the servo controller circuit in the resistance bridge.

Referring first to Figure 1, there is shown a resistance bridge servo circuit for measuring and indicating resistance. Starting with the bridge arm including the measured resistance and progressing in a counterclockwise direction, it can be seen that the first bridge arm is formed by connecting a measured resistance 1 in series with one of the group of scale resistors 2 selected by switch 3. The second arm is formed by one of a group of scale resistors 4 selected by switch 5. The switch 3 can be ganged to switch 5 and the resistors 2 and 4 are multiplier resistors.

The next, third, arm of the bridge includes two resistors 6 and 7 which are connected in series as shown. The resistor 7 is adjustable and is used for ohms calibration if such calibration becomes necessary due to aging of components. The last arm comprises three resistors 8, 9 and 10. Resistor 8 is adjustable and is servo-varied to balance the bridge in operation. Resistor 10 is adjustable for zero indication setting of an indicator unit.

The four bridge arms are connected in series to form a closed loop having junctions *a*, *b*, *c* and *d*. Junction point *a* is connected to ground and a battery 11 is effectively connected between the ends *a* and *c* of the bridge. A comparator branch is connected between the centers *b* and *d* of the bridge and functions primarily to detect the difference between the voltage at junction points *b* and *d* which is an error voltage.

The comparator branch includes a chopper 12 having exciting coil 12*a*, first and second contacts 12*b* and 12*c*, and pole 12*d*. Contact 12*b* is connected to junction point *d*, pole 12*d* is connected to ground through capacitor 13, and coil 12*a* is connected to a 12.6 volt, 60 cps. supply, for example. Contact 12*c* is connected to resistor 14 which, in turn, is connected to junction point *b* through a resistor 15. A capacitor 16 is connected to the common junction of resistors 14 and 15 to ground.

A capacitor 17 is connected to the common junction of contact 12*c* and resistor 14 to the input of amplifier 18. Resistor 19 is connected from the input of amplifier 18 at junction point *x* to ground. The output of amplifier 18 is used to drive servomotor 20 which is mechanically connected to actuate the adjustable tap of resistor 8 and the indicating dials of mechanical counter 21. Amplifier 18 must amplify both large and small error voltages sufficiently to operate servomotor 20 while maintaining servo loop stability. In addition, the amplifier 18 must be free from input noise and 60 cps. pickup.

The elimination of potentiometer noise from resistor 8 is effected by the sampling action of the chopper and the capacitor 13. The chopper connects the ungrounded side of capacitor 13 alternately to junction point *d* and to input capacitor 17 so that there is no direct connection between the servo-varied resistor 8 and amplifier 18. When capacitor 13 is momentarily connected to junction point *d*, it quickly charges to the potential of the bridge arm including resistor 8. On the next half cycle, 1/120 second later, capacitor 13 is connected to the amplifier 18 through input capacitor 17 where its charge is compared with the direct voltage from junction point *b*.

Input noise and hum attenuation are accomplished by the filtering action of resistor 15 and capacitor 16, and also by the A.C. attenuation factor of resistors 14 and 19. It is noted that resistor 19 is also the grid return resistor for amplifier 18. To further reduce the possibility of hum pickup, the heater of the first voltage amplifier stage is supplied with direct current.

The combination of chopper 12, capacitor 13 with resistor 14, capacitor 17 and resistor 19 forms a controller circuit providing a low noise, stabilizing output. The values of resistors 14 and 19 and of capacitor 17 must be such as to provide sensibly critical damping of the servo loop through derivative control, and the replacement of any of these components with one of different value would result in under or over-damping of the system. This circuit is described in detail later.

Referring now to Figure 2, a detailed wiring diagram of a preferred embodiment of amplifier 18 is illustrated including connections with servomotor 20 and counter 21. Three voltage amplifier stages 22, 23 and 24, a phase inverter 25 and a push-pull power output stage 26 are employed to amplify the 60 cps. error signal and control the servomotor 20. The control grid of stage 22 is connected to junction point $x$ (see Figure 1) and the amplifier 18 is generally conventional except for amplifier stage 24 and the output coupling circuit.

Amplifier 24 is direct-coupled to the grid of phase inverter 25, deriving its plate voltage from the cathode of phase inverter 25. Resister 27, which is the plate load resistor for amplifier 24 and also the grid return for phase inverter 25, biases phase inverter 25 by means of the small voltage drop across it caused by the plate current of amplifier 24. The voltage gain of amplifier 24 is approximately equal to the $\mu$ of the tube since the output signal at the cathode of phase inverter 25 is almost equal to the signal at the plate of amplifier 24 and, consequently, presents a very high load impedance to amplifier 24.

Since amplifier 24 has a very low plate voltage, it is easily cut off and easily saturated by relatively small grid signals. This provides a limiting effect which prevents excessive output from large error signals. The maximum output voltage from the plate and cathode of the phase inverter 25 is slightly less than that which would cause the output tubes 26 to draw grid current. This prevents the amplifier from blocking on large error signals.

The power output from the tubes 26 is impedance coupled to the control winding 20*a* of the servomotor 20 by transformer 28. This means of coupling keeps D.C. out of the motor winding 20*a*, preventing chattering and cogging. The output efficienty is high since the choke action of transformer 28 confines most of the A.C. signal to the motor winding 20*a*.

Two feedback loops are used to stabilize the gain of the amplifier 18. One feedback signal is taken from the secondary of transformer 28 and coupled through resistor 29 to the cathode of amplifier 24. The other is obtained by resistor 30 which provides shunt feedback from amplifier stage 23 to 22, to reduce the effects of tube aging, line voltage variations, etc. on the performance of the system.

Line voltage is applied across servomotor winding 20*b* and a limit switch 31, when actuated, connects an indicator lamp 32 to line voltage. Switch 31 is mechanically actuated when the indicating dials of counter 21 are over-driven. Indicator lamp 32 is red, for example, and mechanical stops are provided to keep the indicating dials from moving too far to damage the mechanism. The counter 21 is preferably a multiple stage decimal counter such that a digital (numerical) indication is obtained.

Figure 3:
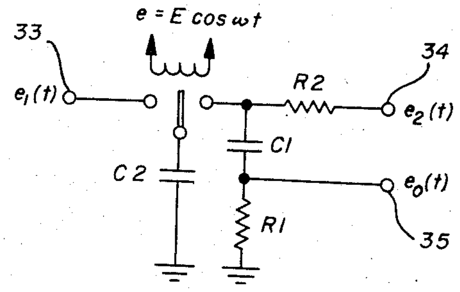
Figure 3 is a wiring diagram of the basic servo controller circuit.

Figure 3 shows the controller circuit which performs the functions of a modulator and mixer as well as a derivative controller and noise filter. In this figure, the various components have been labeled more generally but the circuit is identical to that employed and shown in Figure 1. The chopper coil is excited by a voltage $e=E\cos wt$, the input voltage to the left side of the chopper on terminal 33 is designated $e_1(t)$ and the comparison voltage $e_2(t)$ is applied to terminal 34. Output voltage $e_0(t)$ is obtained from a terminal 35. Capacitor C1 is connected to the right contact of the chopper in series with resistor R1 to ground. Capacitor C2 connects the chopper pole to ground. Terminal 34 is connected to the chopper right contact through resistor R2 and the output terminal 35 is connected to the junction of capacitor C1 and resistor R1.

Typical component values are as follows: C1 is .005 mfd., C2 is .047 mfd., R1 is 1 megohm and R2 is 10 megohms, for example. It is noted that R2 and C2 are large in comparison to R1 and C1, respectively. Modulation is performed by the chopper. When the chopper pole makes with the left contact, C2 quickly charges to the potential of $e_1(t)$. On the next half cycle the pole makes with the right contact and the voltage on C2 is effectively compared with $e_2(t)$. The resulting output signal is a modulated carrier at the angular frequency $w$.

Although an electromechanical chopper has been shown, it is obvious that electronic switches utilizing diode bridges, transistors, vacuum tubes, photocells, etc. can be used to perform the switching function.

Figure 4:
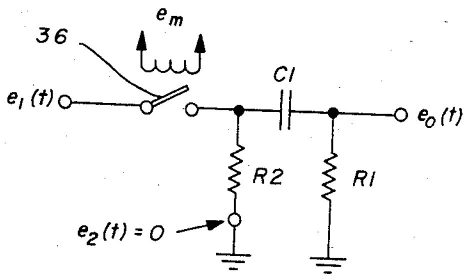
Figure 4 is a simplified wiring diagram of the basic circuit of Figure 3.
Figure 5:
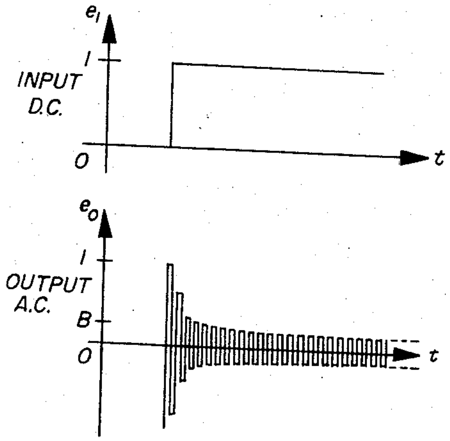
Figure 5 is a graph illustrating the response of the servo controller circuit to a step function input of voltage.

Figure 4 is a simplified circuit for Figure 3. The chopper and capacitor C2 are replaced schematically by a switch 36 which is operated at the frequency of the exciting voltage $e_m$. The circuit associated with the switch 36 produces a derivative plus proportional output. When the input signal to this circuit is a unit step function as shown by the upper graph of Figure 5, the output is a decaying transient as shown in the lower graph of Figure 5. The initial value of the output is equal to the input step and decays to a steady state fraction B of the initial value.

By inspection of Figure 4, it is seen that the initial value of $e_0(t)$ is equal to the input step when switch 36 is closed. It is now demonstrated that after a period of time, the output decreases to a fraction B of the initial value.

Referring to the circuit of Figure 4, the following definitions are used.

$T_1$—Time the switch is closed.
$T_2$—Time the switch is open.
$T_1+T_2$—One complete cycle.

$$\frac{T_1}{T_1+T_2}=M=(1-N)$$

$$\frac{T_2}{T_1+T_2}=N=(1-M)$$

$i_1$—Current flow through R1 and C1 during $T_1$ (switch closed).
$i_2$—Discharge current for C1 through R1 and R2 during $T_2$ (switch open).
$Q_1=i_1T_1$
$Q_2=i_2T_2$
$E_1$—Input voltage.
$E_c$—Capacitor voltage.
$e_0$—Output voltage (peak-to-peak).

Derivation:

$$Q_1\approx\frac{E_1-E_c}{R_1}T_1$$

$$Q_2\approx\frac{E_c}{R_1+R_2}T_2$$

But, at equilibrium or the steady state condition, $$Q_1=Q_2$$

then $$\frac{E_1-E_c}{R_1}T_1=\frac{E_cT_2}{R_1+R_2} \quad \text{(Eq. 1)}$$

Since $$e_0=E_1-E_c+E_c\frac{R_1}{R_1+R_2}$$

$$e_0=\frac{R_1}{R_1+R_2}\,\frac{T_2}{T_1}E_c+E_c\frac{R_1}{R_1+R_2} \quad \text{(Eq. 2)}$$

From Equation 1

$$E_e=E_1\frac{T_1(R_1+R_2)}{(T_1+T_2)R_1+T_1R_2} \quad \text{(Eq. 3)}$$

Substituting in Equation 2

$$\frac{e_0}{E_1}=\frac{R_1}{R_1+MR_2}=B \quad \text{(Eq. 4)}$$

or $$B=\frac{R_1}{NR_1+M(R_1+R_2)} \quad \text{(Eq. 5)}$$

Equation 5 shows that the steady state value of the output is reduced to a fraction B of the initial value of the output (or input step). It is also clear from the inspection of Figure 4 that a finite time is required for the transition from the initial value of $e_0$ to the steady state value, which time is a function of the charging time of $C_1$.

Figure 6:
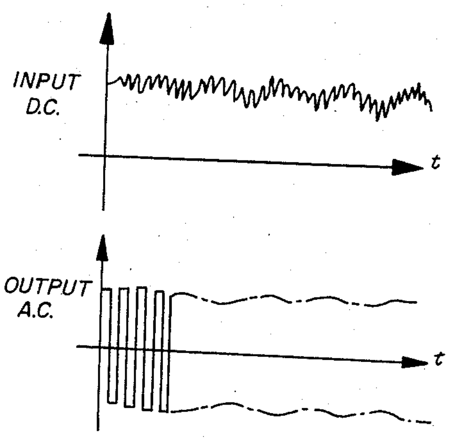
Figure 6 is a graph illustrating the behavior of the servo controller circuit to a D.C. input including noise.

Figure 6 illustrates the A.C. envelope output (upper graph) for a D.C. input (lower graph) to the circuit of Figures 3 or 4. It is noted that the noise spikes of the input do not appear in the output waveform except as random variations of peak amplitude of successive cycles of the carrier; i.e., the noise is not transmitted through the carrier amplifiers except as modulation of the carrier, and the noise bandwidth cannot exceed one half the carrier frequency.

Since the controller circuit is thus demonstrated to produce a derivative plus proportional output, the incorporation of this circuit in a servo circuit provides a stabilized servo circuit. The servo circuit is sensitively precise in that noise is eliminated from the carrier.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

While in order to comply with the statute, the invention has been described in language more or less specific as to structural features. It is to be understood however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A servo controller circuit, comprising: a chopper having a pole and first and second contacts; first and second input terminals adapted to receive respective input signals, said first input terminal connected to said first contact; a first resistor connecting said second input terminal to said second contact; a first capacitor connecting said pole to a ground terminal; a second resistor connected to said ground terminal; a second capacitor connecting said second contact to said second resistor; and an output terminal connected to the common junction of said second capacitor and said second resistor.

2. Apparatus in accordance with claim 1 wherein the value of said first capacitor is large in comparison to said second capacitor.

3. Apparatus in accordance with claim 1 in which the values of said first and second resistors and said first and second capacitors are selected to provide substantially critical damping of the servo circuit.

4. Apparatus in accordance with claim 1 in which the value of said first capacitor is large in comparison to said second capacitor and the values of said first and second resistors and said second capacitors are selected to provide substantially critical damping of the servo circuit.

5. Apparatus in accordance with claim 1 in which said second input terminal is connected to said ground terminal.

6. Apparatus in accordance with claim 5 in which the value of said first capacitor is large in comparison to said second capacitor and the values of said first and second resistors and said second capacitor are selected to provide substantially critical damping of the servo circuit.

7. A self balancing resistance bridge servo circuit, comprising: a bridge circuit including a first resistor connected in a first arm, a second resistor connected in a second arm, a third resistor connected in a third arm, a fourth adjustable resistor connected in a fourth arm, said arms connected in series order to form said bridge; means for connecting an unknown resistance in said first arm in series with said first resistor; a source of voltage connecting the common junctions of said second and third arms and said first and fourth arms, the common junction of said first and fourth arms being connected to a ground terminal; a chopper having a pole and first and second contacts, the common junction of said third and fourth arms being connected to said first contact; a first capacitor connecting said pole to said ground terminal; a fifth resistance connecting the common junction of said first and second arms to said second contact; an amplifier having an input network and an output, the amplifier input network including a second capacitor connecting said second contact to a control grid of said amplifier, and a grid return resistor connecting said control grid to said ground terminal; and a servo motor connected to the output of said amplifier, said servo motor being adapted to drive said fourth adjustable resistor to reduce the amplifier input signal whereby said fourth adjustable resistor is adjusted to balance said bridge.

8. Apparatus in accordance with claim 7 including, in addition, a filter resistance-capacitance network connecting said fifth resistor to the common junction of said first and second arms.

9. Apparatus in accordance with claim 7 including, in addition, a sixth adjustable resistor connected in said fourth arm in series with said fourth adjustable resistor.

10. Apparatus in accordance with claim 7 including, in addition, indicating means adapted to be driven by said servo motor.

11. Apparatus in accordance with claim 7 wherein said amplifier includes at least one amplifier stage and a phase inverter, said amplifier being direct coupled to a control grid of said phase inverter; and a resistor connecting said grid to the cathode of said phase inverter, said resistor functioning as the plate load resistor for said amplifier stage and also as the grid return for said phase inverter.

12. A servo controller circuit, comprising: a first and a second input terminal, and a ground terminal, said first input terminal and said ground terminal adapted to receive therebetween a first input signal, and said second input terminal and said ground terminal adapted to receive therebetween a second input signal; switching means operable at carrier frequency; an input resistor connecting said second input terminal to one side of said switching means, the other side of said switching means being connected to said first input terminal, whereby said switching means alternately connect and disconnect said first input and said input resistor at said carrier frequency; an output terminal; a capacitor connecting the common junction of said input resistor and said switching means to said output terminal; and an output resistor connected between said output terminal and said ground terminal.

13. Apparatus in accordance with claim 12 in which the values of said input and output resistors and said capacitor are selected to provide substantially critical damaging of the servo circuit.

14. Apparatus in accordance with claim 12 in which said second input terminal is connected to said ground terminal.

15. Apparatus in accordance with claim 14 in which the values of said input and output resistors and said capacitor are selected to provide substantially critical damping of the servo circuit.

References Cited in the file of this patent

UNITED STATES PATENTS

| | | |
|---|---|---|
| 2,593,950 | Williams | Apr. 22, 1952 |
| 2,745,996 | Sylvander | May 15, 1956 |
| 2,781,490 | Mitchell, Jr. | Feb. 12, 1957 |

FOREIGN PATENTS

| | | |
|---|---|---|
| 609,381 | Great Britain | Sept. 29, 1948 |